United States Patent
Sugahara

(10) Patent No.: US 10,875,225 B2
(45) Date of Patent: Dec. 29, 2020

(54) MACHINE BASE FOR INJECTION MOLDING MACHINE

(71) Applicant: FANUC CORPORATION, Yamanashi (JP)

(72) Inventor: Keisuke Sugahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/200,886

(22) Filed: Nov. 27, 2018

(65) Prior Publication Data

US 2019/0168431 A1 Jun. 6, 2019

(30) Foreign Application Priority Data

Dec. 1, 2017 (JP) .................................. 2017-231428

(51) Int. Cl.
*B29C 45/00* (2006.01)
*B29C 45/17* (2006.01)

(52) U.S. Cl.
CPC ...... *B29C 45/1761* (2013.01); *B29C 45/1742* (2013.01); *B29C 2045/1765* (2013.01)

(58) Field of Classification Search
CPC ............ B29C 45/1761; B29C 45/1742; B29C 2045/1765; B29C 45/1744; B29C 45/1743; B29C 2045/1762; B29C 2045/1763

See application file for complete search history.

(56) References Cited

U.S. PATENT DOCUMENTS

| 6,447,284 | B1 | 9/2002 | Hehl | |
| 2013/0142900 | A1* | 6/2013 | Fini | B29C 33/305 |
| | | | | 425/542 |
| 2016/0200020 | A1* | 7/2016 | Senga | B29C 45/1744 |
| | | | | 425/542 |
| 2016/0221241 | A1* | 8/2016 | Schad | B29C 45/32 |

FOREIGN PATENT DOCUMENTS

| CN | 104290254 A | 1/2015 |
| CN | 204725807 U | 10/2015 |
| CN | 106735239 A | 5/2017 |
| JP | H05192956 A | 8/1993 |
| JP | 11-000932 A | 1/1999 |
| JP | 2954858 | 7/1999 |
| JP | 2010-012720 A | 1/2010 |
| JP | 2012111197 A | 6/2012 |
| JP | 2015066764 A | 4/2015 |
| JP | 2015199217 A | 11/2015 |
| JP | 2016137662 A | 8/2016 |
| JP | 2016159595 A | 9/2016 |
| WO | WO-96/08356 | 3/1996 |

\* cited by examiner

*Primary Examiner* — Jacob T Minskey
*Assistant Examiner* — Adrien J Bernard
(74) *Attorney, Agent, or Firm* — Robert P. Michal Esq.; Carter, DeLuca & Farrell LLP

(57) ABSTRACT

A machine base for an injection molding machine is equipped with an upper frame supporting at least a mold clamping device of the injection molding machine from below, two lower frames supporting the upper frame from below in a state of being in contact with a bottom surface of the upper frame, and a plurality of height adjusting mounts respectively attached to bottom surfaces of the two lower frames and configured to adjust the height of the injection molding machine.

5 Claims, 3 Drawing Sheets

MACHINE BASE FOR INJECTION MOLDING MACHINE

CROSS-REFERENCE TO RELATED APPLICATION

This application is based upon and claims the benefit of priority from Japanese Patent Application No. 2017-231428 filed on Dec. 1, 2017, the contents of which are incorporated herein by reference.

BACKGROUND OF THE INVENTION

Field of the Invention

The present invention relates to a machine base for supporting an injection molding machine from below.

Description of the Related Art

Japanese Laid-Open Patent Publication No. 2010-012720 discloses a machine base which is equipped with an upper frame supporting an injection molding machine form below, a plurality of supporting pillars extending downward from a bottom surface of the upper frame, and a lower frame supporting the plurality of supporting pillars under the upper frame.

SUMMARY OF THE INVENTION

However, in the machine base like this, the number of components increases and results in an increase in manufacturing workload, and thus, there is a concern that the manufacturing cost becomes high. Further, there is another concern that due to the load on the injection molding machine, deflection occurs at portions of the upper frame which are not supported by the plurality of supporting pillars. Furthermore, supporting the upper frame by the plurality of supporting pillars causes the center of gravity of the machine base to be located high, which gives rise to a further problem that vibration is liable to be generated.

Accordingly, it is an object of the present invention to provide a machine base for an injection molding machine which is high in rigidity, can suppress vibration, and can be manufactured in a low cost.

In one aspect, the present invention resides in a machine base for an injection molding machine, and the machine base is equipped with an upper frame supporting the injection molding machine from below and a lower frame supporting the upper frame from below in a state of being in contact with the upper frame.

According to the present invention, because no supporting pillar is used, the number of components decreases, which makes it possible to reduce man-hours such as man-hours for assembly workloads and man-hours for welding, in manufacturing the machine base. Further, because the contact area between the upper frame and the lower frame becomes large in comparison with the case that the upper frame is supported by the supporting pillars, deflection of the upper frame is restrained from being generated due to the load of the injection molding machine, so that it is possible to secure the rigidity of the machine base. Furthermore, because no supporting pillar is used, it is possible to lower the center of gravity of the machine base, and to suppress the generation of vibration. As a result, it is possible to manufacture at a low cost the machine base which is high in rigidity and is capable of suppressing vibration.

The above and other objects, features, and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

Figure 1:
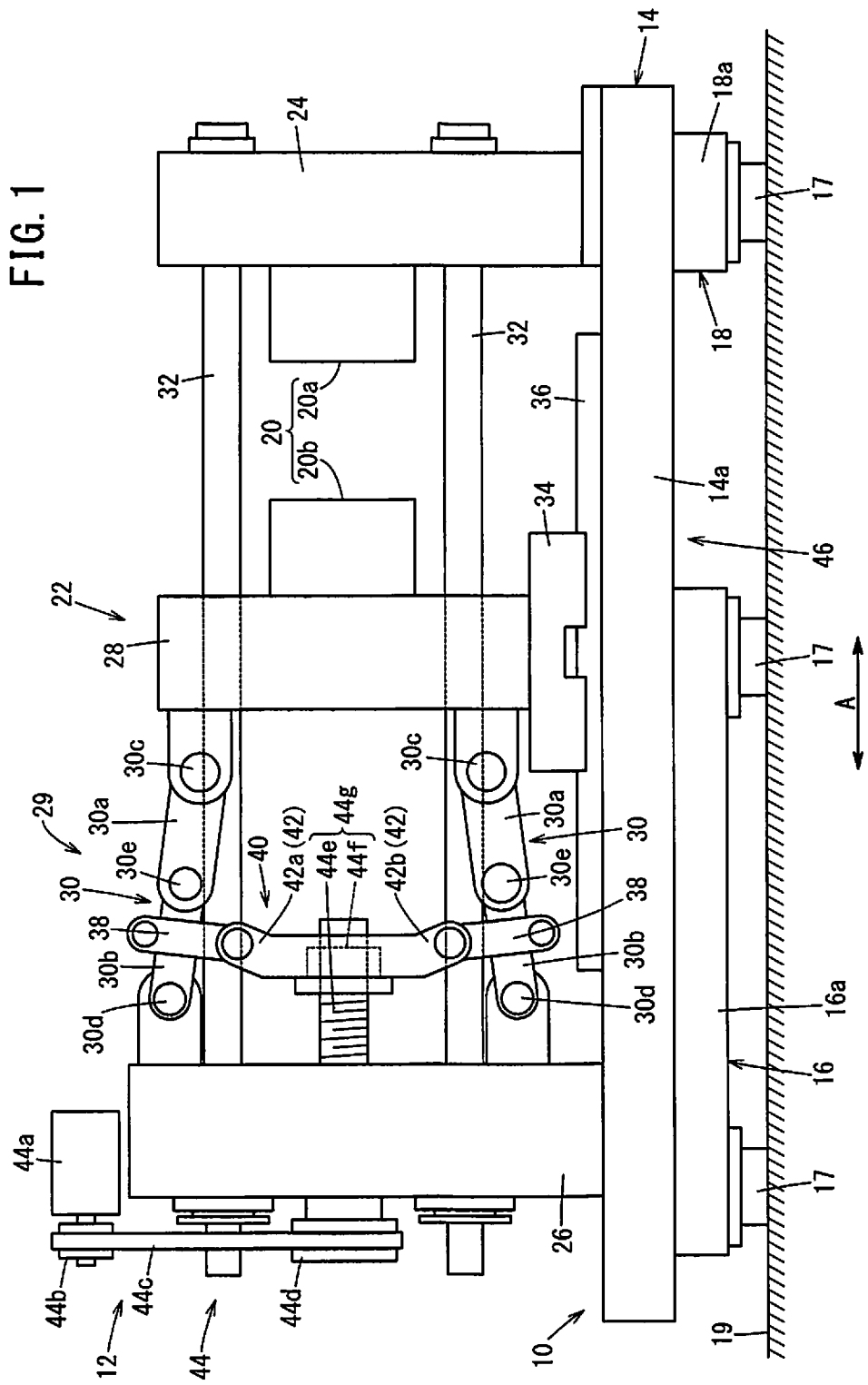
FIG. 1 is a side view of a machine base in an embodiment according to the present invention.

Hereinafter, a machine frame for an injection molding machine according to the present invention will be described in detail based on a preferred embodiment with reference to the accompanying drawings.

Configuration of Present Embodiment

As shown FIG. 1, a machine base 10 for an injection molding machine in the present embodiment (hereafter also referred to as machine base 10 in the present embodiment) is equipped with an upper frame 14 supporting the injection molding machine 12 from below and two lower frames 16, 18 supporting the upper frame 14 from below in a state of being in contact with a bottom surface of the upper frame 14. The two lower frames 16, 18 support the upper frame 14 from below by being arranged with a predetermined space in the arrow A direction in the state of being in contact with the bottom surface of the upper frame 14. Further, each of the two lower frames 16, 18 is installed on an installation surface 19 through a plurality of height adjusting mounts 17.

Here, the configuration of the injection molding machine 12 will be described in advance of the detailed description of the machine base 10 according to the present embodiment.

The injection molding machine 12 has a mold clamping device 22 for opening and closing a mold 20 and an injection device (not shown) for injecting melted resin into the mold 20. FIG. 1 shows a case that the machine base 10 supports the mold clamping device 22 from below. Incidentally, the machine base 10 may support the injection device.

The mold clamping device 22 has a stationary platen 24 disposed on an upper surface of the upper frame 14 on one end side in the arrow A direction, a rear platen 26 disposed on the upper surface of the upper frame 14 on another end side in the arrow A direction, a moving platen 28 disposed on the upper surface of the upper frame 14 between the stationary platen 24 and the rear platen 26, and a toggle mechanism 29 for moving the moving platen 28 toward and away from the rear platen 26 in the directions of the arrow A.

The stationary platen 24 and the rear platen 26 are connected by four tie bars 32 piercing through the moving platen 28 and extending mutually in parallel in the arrow A direction. The moving platen 28 is installed on the upper surface of the upper frame 14 through a sliding unit 34. The sliding unit 34 is movable along a guide rail 36 which is provided on the upper surface of the upper frame 14 in the arrow A direction. With this arrangement, the moving platen 28 is movable toward and away from the stationary platen 24 in the directions of the arrow A.

The mold 20 is provided between the stationary platen 24 and the moving platen 28. The mold 20 is composed of a stationary mold 20a and a moving mold 20b. The stationary mold 20a is attached to the stationary platen 24 on the moving platen 28 side. The moving mold 20b is attached to the moving platen 28 on the stationary platen 24 side.

The toggle mechanism 29 is provided between the rear platen 26 and the moving platen 28. The toggle mechanism 29 has four toggle links 30 in total including two toggle links on each of upper and lower sides, cross links 38 and a cross head 40. Each of the four toggle links 30 includes a first link rod 30a, a second link rod 30b, a first toggle pin 30c, a second toggle pin 30d, and a third toggle pin 30e.

One end of the first link rod 30a is pivotably connected to the moving platen 28 through the first toggle pin 30c. One end of the second link rod 30b is pivotably connected to the rear platen 26 through the second toggle pin 30d. Another end of the first link rod 30a and another end of the second link rod 30b are pivotably connected to each other through the third toggle pin 30e.

The second link rod 30b is connected to the cross head 40 through the cross link 38. The cross head 40 has arms 42 (upper arms 42a and lower arms 42b), respectively extending upward and downward. The cross links 38 are connected to respective end portions of the arm 42. The cross head 40 is provided on the rear platen 26 and can advance and retract in the directions of the arrow A by being guided along two guide rods (not shown) extending in the arrow A direction.

The mold clamping device 22 further has a mold opening and closing mechanism 44 for opening and closing the mold 20 in the directions of the arrow A (the opening/closing direction). The mold opening and closing mechanism 44 is equipped with a mold opening and closing motor 44a, a drive pulley 44b, a belt 44c, a driven pulley 44d, a ball screw 44e, and a ball screw nut 44f. The ball screw 44e is provided along the arrow A direction to become parallel to the tie bars 32.

The drive pulley 44b is provided rotatably integrally with a rotational shaft of the mold opening and closing motor 44a. The driven pulley 44d is provided rotatably integrally with the ball screw 44e. The belt 44c is wound around the drive pulley 44b and the driven pulley 44d and transmits the rotational power of the drive pulley 44b to the driven pulley 44d. The ball screw nut 44f is fixed to the cross head 40 and is in screw engagement with the ball screw 44e. The ball screw nut 44f moves along the ball screw 44e when the ball screw 44e is rotated.

In this case, when the mold opening and closing motor 44a is rotated, the rotational power is transmitted to the ball screw 44e through the drive pulley 44b, the belt 44c and the driven pulley 44d, and the ball screw 44e is thus rotated. This causes the ball screw nut 44f and the cross head 40 to move along the guide rods in the directions of the arrow A. As a result, the moving platen 28 is moved through the cross links 38 and the toggle links 30 in the directions of the arrow A. Incidentally, the ball screw 44e and the ball screw nut 44f constitute an advancing and retracting mechanism 44g for advancing and retracting the cross head 40 in the directions of the arrow A.

When the moving platen 28 is moved toward the stationary platen 24 side, the moving mold 20b is brought into abutment on the stationary mold 20a to close the mold 20. Further, when the moving platen 28 is moved toward the rear platen 26 side, the moving mold 20b goes away from the stationary mold 20a to open the mold 20.

Incidentally, the mold clamping device 22 has an ejector mechanism (not shown) for taking out a molded article (a molding) from the moving mold 20b. The ejector mechanism is provided on the moving platen 28, on the rear platen 26 side, and moves an ejector pin extending in the arrow A direction toward the moving platen 28 side in a state that the mold 20 is open, to push the molded article out of the moving mold 20b.

Next, the machine base 10 supporting the injection molding machine 12 from below in the present embodiment will be described in detail with reference to FIGS. 1 to 3.

The two lower frames 16, 18 constituting the machine base 10 are arranged along the arrow A direction so as to provide a vacant lower region 46 of the mold 20. The one lower frame 16 on the left side in FIGS. 1 and 3 supports the bottom surface of the upper frame 14 within a range which extends from a lower side of the rear platen 26 to a lower side of a predetermined position in a moving range of the moving platen 28 in the arrow A direction (for example, the position of the moving platen 28 shown in FIG. 1). Further, the other lower frame 18 on the right side supports the bottom surface of the upper frame 14 from the lower side of the stationary platen 24. Accordingly, the two lower frames 16, 18 support the bottom surface of the upper frame 14 in a separate state with a predetermined space therebetween in the arrow A direction. With this configuration, it is possible to take out molded articles between the upper frame 14 and the installation surface 19 in the lower region 46 of the mold 20.

Further, as shown in FIG. 1, the plurality of height adjusting mounts 17 are provided on bottom surfaces of the two lower frames 16, 18. By adjusting the height of each of the plurality of height adjusting mounts 17, it is possible to adjust the height of the injection molding machine 12 disposed on the upper surface of the upper frame 14.

Here, the upper frame 14 and the two lower frames 16, 18 will be described specifically.

Figure 2:
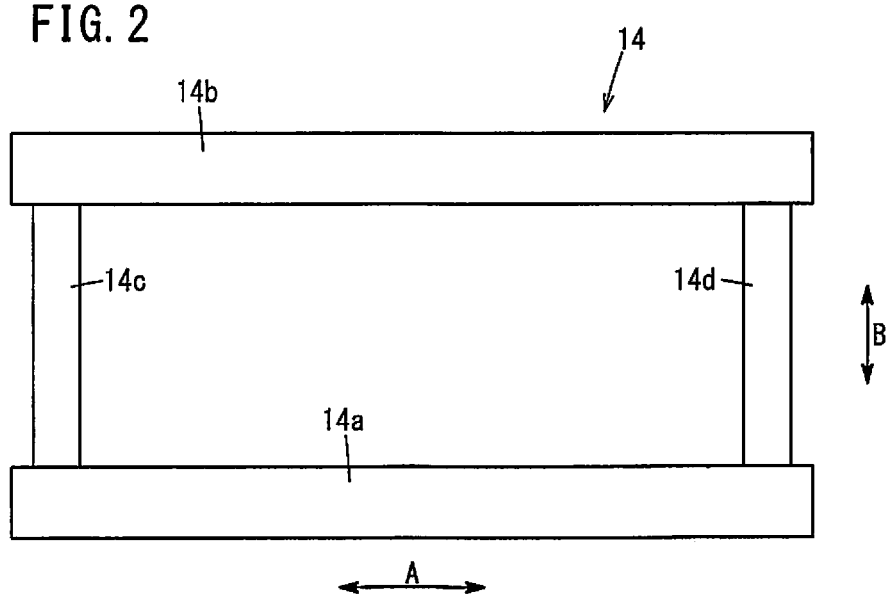
FIG. 2 is a plan view of an upper frame shown in FIG. 1.

As shown in FIGS. 1 and 2, the upper frame 14 is equipped with a pair of first members 14a, 14b, which are rectangular columnar members and extend in the arrow A direction, and a pair of second members 14c, 14d, which are rectangular columns and extend in the arrow B direction orthogonal to the arrow A direction (i.e., in the width direction of the machine base 10 which direction is normal to the drawing sheet of FIG. 1) and connect both ends in the arrow A direction of the pair of first members 14a, 14b. That is, the upper frame 14 is a rectangle frame member horizontally extending in the arrow A direction and the arrow B direction. Incidentally, each of the first members 14a, 14b and the second members 14c, 14d need not necessarily be a rectangular column member but may be a member formed in an I-shape, a C-shape or an H-shape in cross section. Further, each of the first members 14a, 14b and the second members 14c, 14d may be formed by a combination of members having a rectangular, an I-shape, a C-shape, and/or an H-shape in cross section.

The mold clamping device 22 (refer to FIG. 1) is disposed on the upper surfaces of the pair of first members 14a, 14b so as to be supported from below by the upper frame 14. Therefore, when the machine base 10 is viewed in the arrow A direction, the pair of second members 14c, 14d connect the pair of first members 14a, 14b while in the state of being out of contact with the mold clamping device 22. Alternatively, the pair of second members 14c, 14d, together with the pair of first members 14a, 14b, may support the mold clamping device 22 from below in contact with the mold clamping device 22. Further, it is adequate that the pair of first members 14a, 14b are connected to the pair of second members 14c, 14d by a well-known method such as welding or the like.

In this manner, the upper frame 14 is a frame member supporting the mold clamping device 22 from below and providing the vacant lower region 46 of the mold 20. With this configuration, it is possible to guide molded articles between the upper frame 14 and the installation surface 19 in the lower region 46 of the mold 20.

Incidentally, unless interfering with molded articles, each of the first members 14a, 14b and the second members 14c, 14d of the upper frame 14 may be made of plural members. By this arrangement, it is possible for the upper frame 14 to support the mold clamping device 22 from below without substantial deflection of the upper frame 14.

Figure 3:
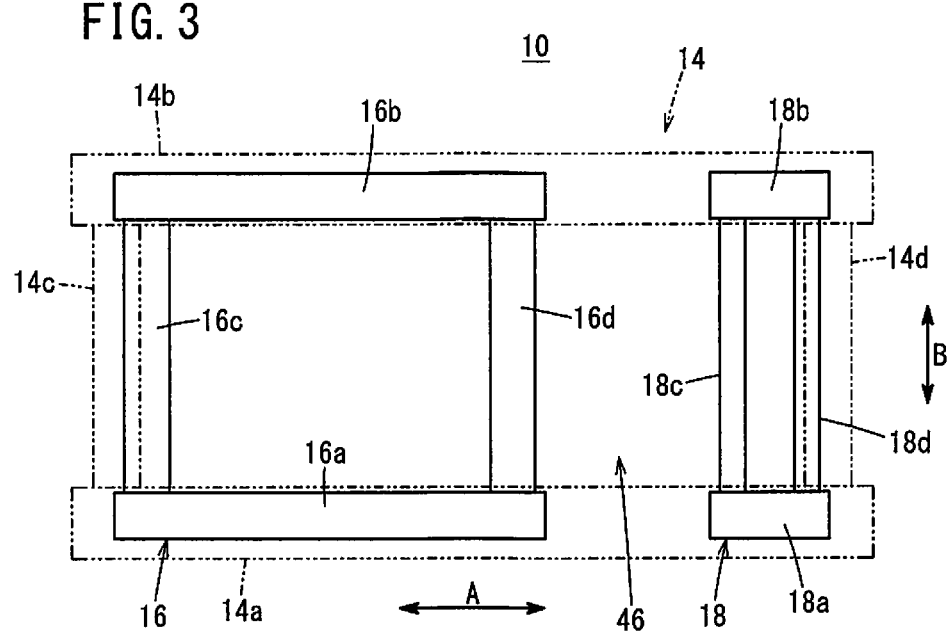
FIG. 3 is a plan view of lower frames shown in FIG. 1.

As shown in FIGS. 1 and 3, each of the two lower frames 16, 18 is equipped with the pair of first members 16a, 16b or 18a, 18b which are rectangular columnar members and extend in the arrow A direction, and the pair of second members 16c, 16d or 18c, 18d which are rectangular columnar members and extend in the arrow B direction and connecting both end portions in the arrow A direction of the pair of first members 16a, 16b or 18a, 18b. That is, as with the upper frame 14, each of the two lower frames 16, 18 is a rectangular frame member horizontally extending in the arrow A direction and in the arrow B direction. Incidentally, each of the first members 16a, 16b, 18a, 18b and the second members 16c, 16d, 18c, 18d need not necessarily be a rectangular columnar member but may be a member formed in an I-shape, a C-shape or an H-shape in cross section. Further, each of the first members 16a, 16b, 18a, 18b and the second members 16c, 16d, 18c, 18d may be formed by a combination of members having a rectangular, an I-shape, a C-shape, and/or an H-shape in cross section.

The two lower frames 16, 18 each support the upper frame 14 from below in a manner that the upper surfaces of the pair of first members 16a, 16b or 18a, 18b are in contact with the bottom surfaces of the pair of first members 14a, 14b of the upper frame 14. Therefore, when the machine base 10 is viewed in the arrow A direction, although not shown, the pair of second members 16c, 16d or 18c, 18d mutually connect the pair of the first members 16a, 16b or 18a, 18b in the state of being out of contact with the upper frame 14. Alternatively, the second member 16c of the lower frame 16 may support the second member 14c of the upper frame 14 from below, and the second member 18d of the lower frame 18 may support the second member 14d of the upper frame 14 from below. Further, it is adequate that the pair of first members 16a, 16b or 18a, 18b are connected to the pair of the second members 16c, 16d or 18c, 18d by a well-known connecting method such as welding or the like.

Furthermore, the upper frame 14 and the two lower frames 16, 18 are each a rectangular frame member, and the two lower frames 16, 18 are arranged with a predetermined space to provide the vacant lower region 46 of the mold 20. Thus, as shown in FIG. 3, a space that is surrounded by the pair of first members 14a, 14b of the upper frame 14, the second member 16d of the one lower frame 16 near the other lower frame 18 and the second member 18c of the other lower frame 18 near the one lower frame 16 becomes a region which provides the vacant lower region 46 of the mold 20.

Accordingly, it is possible to easily guide molded articles to the space between the upper frame 14 and the installation surface 19 in the lower region 46 of the mold 20.

Further, the plane area of the pair of first members 16a, 16b constituting the one lower frame 16 is larger than the plane area of the pair of first members 18a, 18b constituting the other lower frame 18. Therefore, the contact area between the pair of first members 16a, 16b of the one lower frame 16 and the pair of first members 14a, 14b of the upper frame 14 is larger than the contact area between the pair of first members 18a, 18b of the other lower frame 18 and the pair of first members 14a, 14b of the upper frame 14. As shown in FIG. 1, through the upper frame 14, the one lower frame 16 supports from below the components that are large in weight such as the rear platen 26, the moving platen 28, the toggle mechanism 29 and the like, of the mold clamping device 22. Further, through the upper frame 14, the other lower frame 18 supports from below the components that are small in weight such as the stationary platen 24 and the like. With this configuration, it is possible for the two lower frames 16, 18 to support the upper frame 14 from below without causing the upper frame 14 to be deflected due to the load from the mold clamping device 22.

Incidentally, each of the first members 16a, 16b, 18a, 18b and the second members 16c, 16d, 18c, 18d constituting the two lower frames 16, 18 may be made of plural members. Even in this case, it is possible for the two lower frames 16, 18 to support the upper frame 14 from below without substantial deflection of the upper frame 14.

Further, in a modified form of the present embodiment, the upper frame 14 may be supported from below by the one lower frame. Even in this case, it is possible to support the upper frame 14 from below without substantial deflection of the upper frame 14.

Technical Concept Grasped from Embodiment

Technical ideas that can be grasped from the foregoing embodiment will be described hereinafter.

The machine base (10) for the injection molding machine (12) is provided with the upper frame (14) supporting the injection molding machine (12) from below and the lower frame (16, 18) supporting the upper frame (14) from below in a state of being in contact with the upper frame (14).

In this manner, because no supporting pillar is used, the number of components decreases, and hence, it is possible to reduce man-hours such as man-hours for assembly and man-hours for welding, in manufacturing the machine base (10). Further, in comparison with the case that the upper frame (14) is supported by supporting pillars, the contact area between the upper frame (14) and the lower frame (16, 18) becomes larger, and thus, the upper frame (14) is restrained from being deflected due to the load from the injection molding machine (12). Accordingly, it is possible to secure the rigidity of the machine base (10). Furthermore, because no supporting pillar is used, it is possible to lower the center of gravity of the machine base (10), and to suppress the generation of vibration. Consequently, it is possible to manufacture at a low cost the machine base (10) which is high in rigidity and is capable of suppressing vibration.

The machine base (10) includes the two lower frames (16, 18), and the two lower frames (16, 18) are arranged with a predetermined space and support the upper frame (14) from below in the state of being in contact with the upper frame (14). With this configuration, it becomes possible to take out molded articles from the lower side of the injection molding machine (12) while securing the rigidity of the machine base (10).

The injection molding machine (12) has the mold clamping device (22) configured to open and close the mold (20) and the injection device configured to inject melted resin into the mold (20), wherein the upper frame (14) supports at least the mold clamping device (22) from below. With this configuration, it becomes possible to easily take out molded articles from the lower side of the mold clamping device (22) while supporting the mold clamping device (22) from below.

The two lower frames (16, 18) are arranged along an opening/closing direction (A) of the mold (20) while providing the vacant lower region (46) of the mold (20). With this configuration, it is possible to easily take out molded articles from the lower region (46) of the mold (20).

The mold (20) includes the stationary mold (20*a*) and the moving mold (20*b*). The mold clamping device (22) includes the stationary platen (24) to which the stationary mold (20*a*) is attached, the moving platen (28) to which the moving mold (20*b*) is attached, the rear platen (26), and the toggle mechanism (29) configured to move the moving platen (28) toward and away from the rear platen (26). Of the two lower frames (16, 18), the one lower frame (16) supports the upper frame (14) in a range from a lower side of the rear platen (26) to a predetermined position within a moving range of the moving platen (28), while the other lower frame (18) supports the upper frame (14) on a lower side of the stationary platen (24). With this configuration, it is possible to support the mold clamping device (22) reliably while securing the lower region (46) used for taking out molded articles.

Each of the upper frame (14) and the two lower frames (16, 18) is provided with the plurality of first members (14*a*, 14*b*, 16*a*, 16*b*, 18*a*, 18*b*) extending along the opening/closing direction (A) of the mold (20) and the plurality of second members (14*c*, 14*d*, 16*c*, 16*d*, 18*c*, 18*d*) extending in the direction (B) crossing the opening/closing direction (A) of the mold (20) and connecting the plurality of first members (14*a*, 14*b*, 16*a*, 16*b*, 18*a*, 18*b*). Each of the two lower frames (16, 18) supports the upper frame (14) from below such that the plurality of first members (16*a*, 16*b*, 18*a*, 18*b*) of the lower frame (16, 18) are in contact with the first members (14*a*, 14*b*) of the upper frame (14).

With this configuration, it is possible to support the injection molding machine (12) from below in a simple configuration, and to realize a configuration that is easy to take out molded articles from the lower region (46) of the mold (20).

The machine base (10) is further provided with the height adjusting mount (17) attached to a bottom surface of the lower frame (16, 18) and configured to adjust the height of the injection molding machine (12). With this configuration, it is possible to desirably adjust the height of the injection molding machine (12), while securing the rigidity of the machine base (10).

The present invention is not limited to the embodiments described above, and it goes without saying that the embodiments can be freely modified within a range that does not deviate from the essence and gist of the present invention as set forth in the appended claims.

What is claimed is:

1. A machine base for an injection molding machine, the injection molding machine including a mold clamping device configured to open and close a mold and an injection device configured to inject melted resin into the mold, the mold including a stationary mold and a moving mold, the mold clamping device including a stationary platen to which the stationary mold is attached, a moving platen to which the moving mold is attached, a rear platen, and a toggle mechanism configured to move the moving platen toward and away from the rear platen, the machine base comprising:

an upper frame supporting at least the mold clamping device of the injection molding machine from below, the upper frame having a rear end portion having an upper surface on which the rear platen is fixedly supported, a front end portion having an upper surface on which the stationary platen is fixedly supported, and an intermediate portion extending between the front and rear end portions and having an upper surface on which the moving platen is slidably supported; and two lower frames supporting the upper frame from below in a state of being in contact with the upper frame, wherein:

the two lower frames are arranged with a predetermined space, of the two lower frames, one lower frame supports the rear end portion of the upper frame at a location below the rear platen, and a rear end section of the intermediate portion of the upper frame from below a rear portion of a moving range of the moving platen, while another lower frame supports the front end portion of the upper frame on a lower side of the stationary platen, and the two lower frames are arranged along an opening/closing direction of the mold while providing a void of the mold, wherein the void has a length defined longitudinally between the two lower frames and a height extending along an entire height of the two lower frames.

2. A machine base for an injection molding machine, the injection molding machine including a mold clamping device configured to open and close a mold and an injection device configured to inject melted resin into the mold, the mold comprises a stationary mold and a moving mold, the mold clamping device includes a stationary platen to which the stationary mold is attached, a moving platen to which the moving mold is attached, a rear platen, and a toggle mechanism configured to move the moving platen toward and away from the rear platen, the machine base comprising:

an upper frame supporting at least the mold clamping device of the injection molding machine from below, the upper frame having a rear end portion having an upper surface on which the rear platen is fixedly supported, a front end portion having an upper surface on which the stationary platen is fixedly supported, and an intermediate portion extending between the front and rear end portions and having an upper surface on which the moving platen is slidably supported; and two lower frames arranged with a predetermined space and supporting the upper frame from below in a state of being in contact with the upper frame, wherein:

each of the upper frame and the two lower frames is provided with a plurality of first members extending along an opening/closing direction of the mold and a plurality of second members extending in a direction crossing the opening/closing direction of the mold and connecting the plurality of first members, each of the two lower frames supporting the upper frame from below in a manner that the plurality of first members of the lower frame are in contact with the plurality of first members of the upper frame, the two lower frames are arranged along the opening/closing direction of the mold while providing a void of the mold, wherein the void has a length defined longitudinally between the two lower frames and a height extending along an entire height of the two lower frames, of the two lower frames, one lower frame supports the rear end portion of the upper frame at a location below the rear platen, and a rear end section of the intermediate portion of the upper frame from below a rear portion of a moving range of the moving platen, while another lower frame supports the front end portion of the upper frame on a lower side of the stationary platen.

3. The machine base for the injection molding machine according to claim 1, further comprising:
a height adjusting mount attached to a bottom surface of at least one of the two lower frames and configured to adjust height of the injection molding machine.

4. The machine base for the injection molding machine according to claim 1, wherein the moving range of the moving platen includes a front portion that overlaps with the void and a front end section of the intermediate portion of the upper frame.

5. The machine base for the injection molding machine according to claim 2, wherein the moving range of the moving platen includes a front portion that overlaps with the void and a front end section of the intermediate portion of the upper frame.

\* \* \* \* \*